(12) United States Patent
Tsao et al.

(10) Patent No.: US 8,190,218 B2
(45) Date of Patent: May 29, 2012

(54) FOLDABLE HANDHELD DEVICE

(75) Inventors: Lu-Lung Tsao, Linkou Township, Taipei County (TW); Hsin-Hung Chen, Tucheng (TW); Hui-Liang Yu, Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 392 days.

(21) Appl. No.: 12/585,088

(22) Filed: Sep. 3, 2009

(65) Prior Publication Data
US 2011/0001405 A1    Jan. 6, 2011

(30) Foreign Application Priority Data
Jul. 3, 2009  (TW) .............................. 98212132 U

(51) Int. Cl.
*H04M 1/00*   (2006.01)

(52) U.S. Cl. .................. 455/575.3; 361/679.55; 341/22
(58) Field of Classification Search .............. 455/575.3; 361/679.55, 679.09; 400/472; 341/22; 345/168
See application file for complete search history.

(56) References Cited

U.S. PATENT DOCUMENTS
2004/0254000 A1 * 12/2004 Chen .......................... 455/575.3
* cited by examiner

*Primary Examiner* — Phuoc Doan
(74) *Attorney, Agent, or Firm* — Rabin & Berdo, PC

(57) ABSTRACT

A foldable handheld device is disclosed, which includes a first casing, a second casing, a connecting mechanism for connecting the first casing to the second casing, and an elastic piece disposed on the first casing. The second casing has a support surface and a curved surface connecting to the support surface, wherein the curved surface has a concave portion. An end of the elastic piece has a protrusion disposed thereon, wherein the protrusion is kept touching the second casing when the second casing is rotated related to the first casing along a rotating axle.

6 Claims, 4 Drawing Sheets

FOLDABLE HANDHELD DEVICE

RELATED APPLICATIONS

This application claims priority to Taiwan Application Serial Number 98212132, filed Jul. 3, 2009, which is herein incorporated by reference.

BACKGROUND

1. Field of Invention

The present invention relates to a handheld device. More particularly, the present invention relates to a foldable handheld device.

2. Description of Related Art

With rapid development of 3C industry, handheld devices, such as personal digital assistants, mobile phones, and smart phones, have become popular. Foldable handheld devices, such as a foldable phone, have become a popular handheld device. The conventional foldable handheld device uses a hinge as the pivoting mechanism to provide related rotation between two casings of the foldable handheld device. However, the hinge uses a lot of space in the foldable handheld device. Thus there is a need to minimize the space of the rotating mechanism in the foldable handheld device.

SUMMARY

An embodiment of the present invention provides a foldable handheld device, which includes a first casing, a second casing, a connecting mechanism for connecting the first casing to the second casing, and an elastic piece disposed on the first casing. The second casing has a support surface and a curved surface connected to the support surface, wherein the curved surface has a concave portion. An end of the elastic piece has a protrusion disposed thereon, wherein the protrusion is kept touching the second casing when the second casing is rotated related to the first casing along a rotating axle.

Another aspect of the present invention is a foldable handheld device, which includes a first casing, a second casing including a curved surface, a connecting mechanism for connecting the first casing and the second casing, and a position mechanism. The second casing is rotated related to the first casing. The position mechanism includes an elastic piece disposed on the first casing, and a concave portion disposed on the curved surface. An end of the elastic piece has a protrusion disposed thereon. The protrusion of the elastic piece is kept touching and slid on the curved surface and coupled to the concave portion to position the second casing.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
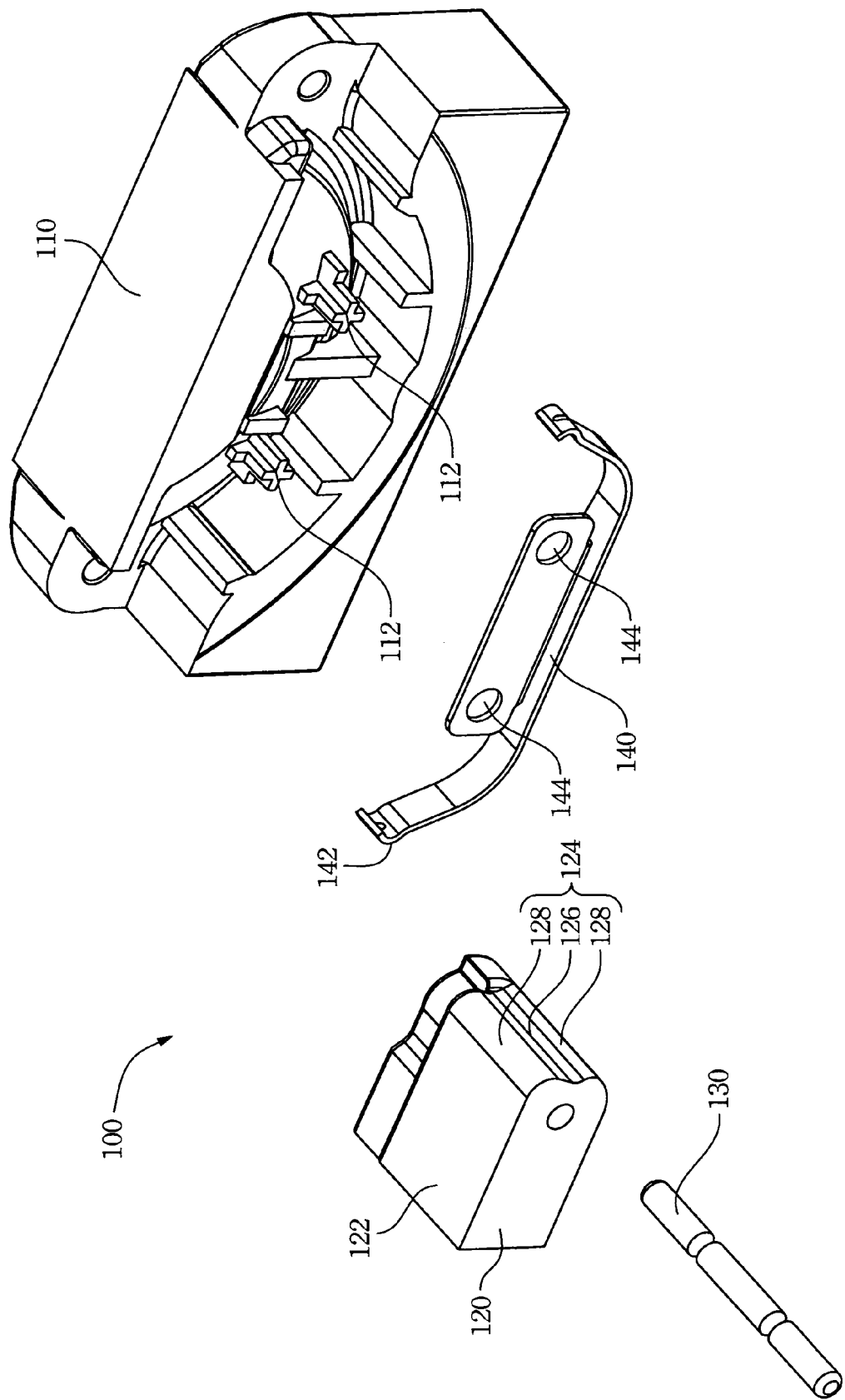
FIG. 1 illustrates an explosion diagram of an embodiment of the foldable handheld device of the invention.

Reference will now be made in detail to the present embodiments of the invention, examples of which are illustrated in the accompanying drawings. Wherever possible, the same reference numbers are used in the drawings and the description to refer to the same or like parts.

Refer to FIG. 1. FIG. 1 illustrates an explosion diagram of an embodiment of the foldable handheld device of the invention. The foldable handheld device 100 of the present embodiment does not use the hinge as the pivoting mechanism. To better describe the present embodiment, some of elements have been omitted in FIG. 1.

The foldable handheld device 100 includes a first casing 110, a second casing 120, a connecting mechanism 130 for connecting the first casing 110 and the second casing 120, and an elastic piece 140 disposed on the first casing 110. The second casing 120 has a support surface 122 and a curved surface 124. The support surface 122 is connected to the curved surface 124, and the support surface 122 is approximately perpendicular to the curved surface 124 in this embodiment. The curved surface 124 has a concave portion 126 thereon. An end of the elastic piece 140 is disposed in contact with the second casing 120. The elastic piece 142 has a protrusion 142 disposed at the end of elastic piece 140, and the protrusion 142 of the elastic piece 140 is kept touching the second casing 120 when the second casing 120 is rotated related to the first casing 110. The material of the elastic piece 140 is a material with elasticity, such as a metal or a plastic.

The connecting mechanism 130 can be a shaft. The shaft of the connecting mechanism 130 passes through the second casing 120 and is fixed on the first casing 110, so that the second casing 120 can be rotated related to the first casing 110. The first casing 110 has at least one position pin 112. The elastic piece 140 has at least one position hole 144. The position hole 144 is coupled to the position pin 112 to fasten the elastic piece 140 on the first casing 110. The curved surface 124 of the second casing 120 has two convex portions 128, and the concave portion 126 is located between the convex portions 128. The curved surface 124 is a smooth surface.

Figure 2A:
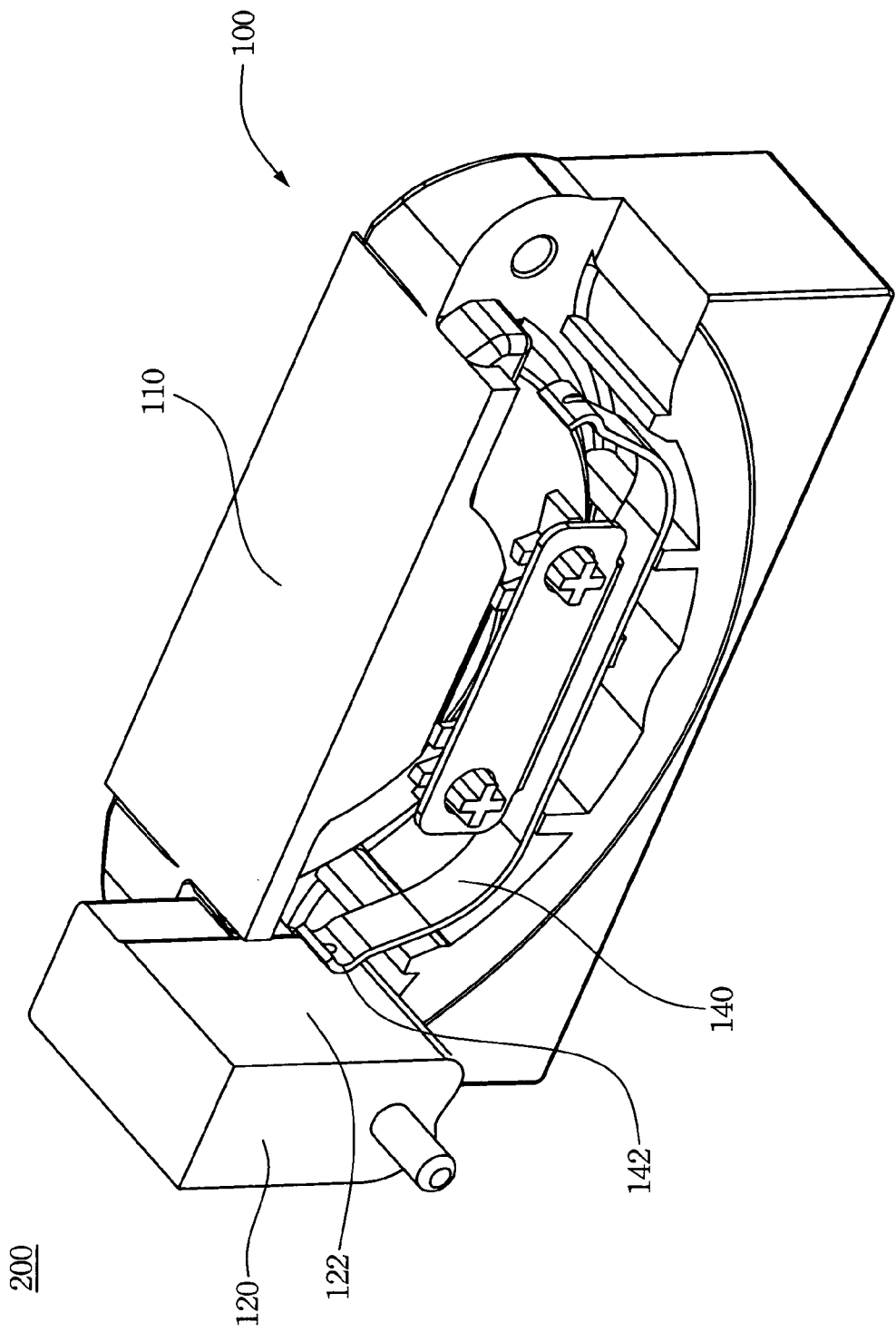
FIG. 2A to FIG. 2C illustrate different operation states of the embodiment of the invention in FIG. 1.
Figure 2B:
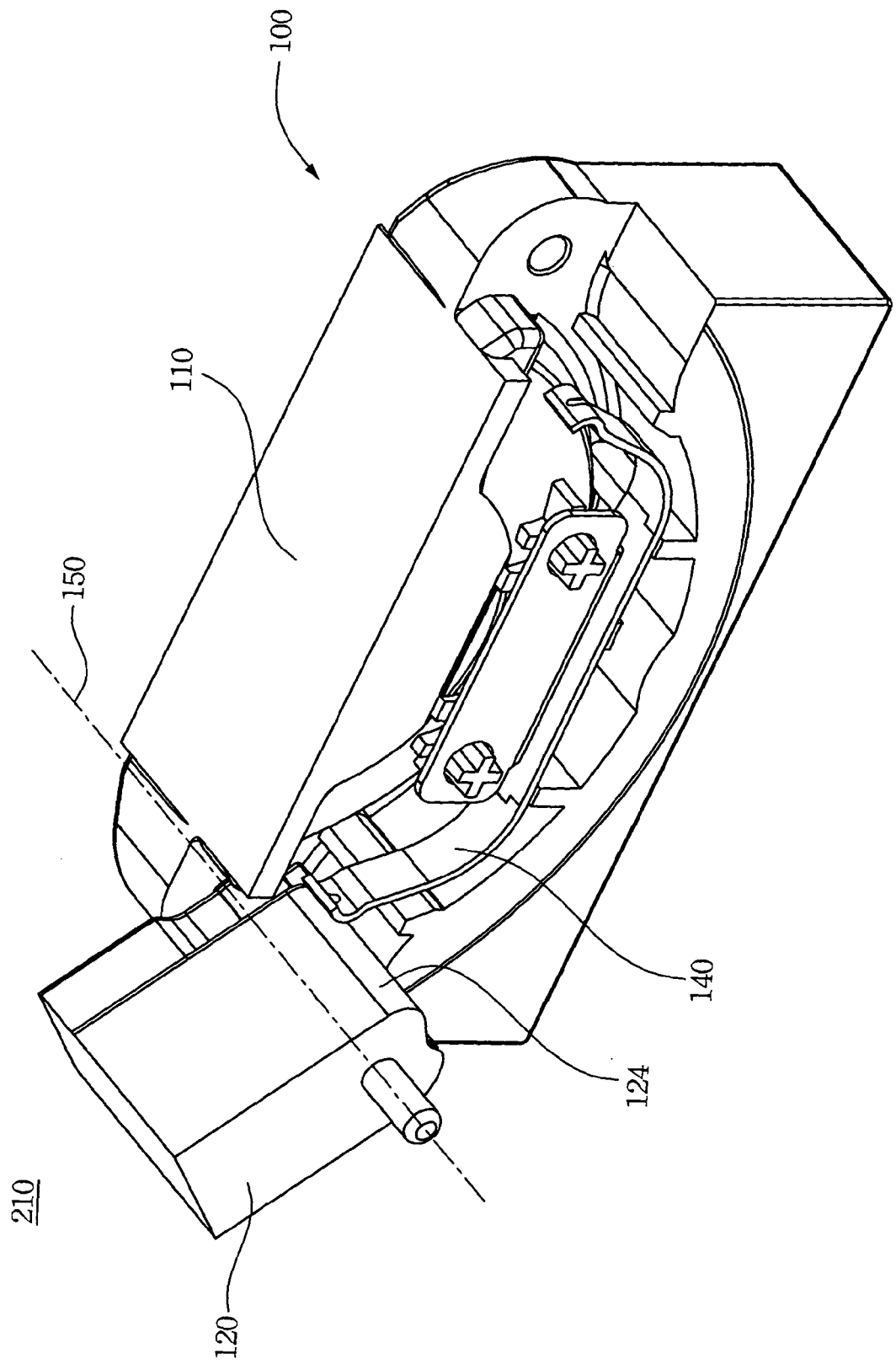
Figure 2C:
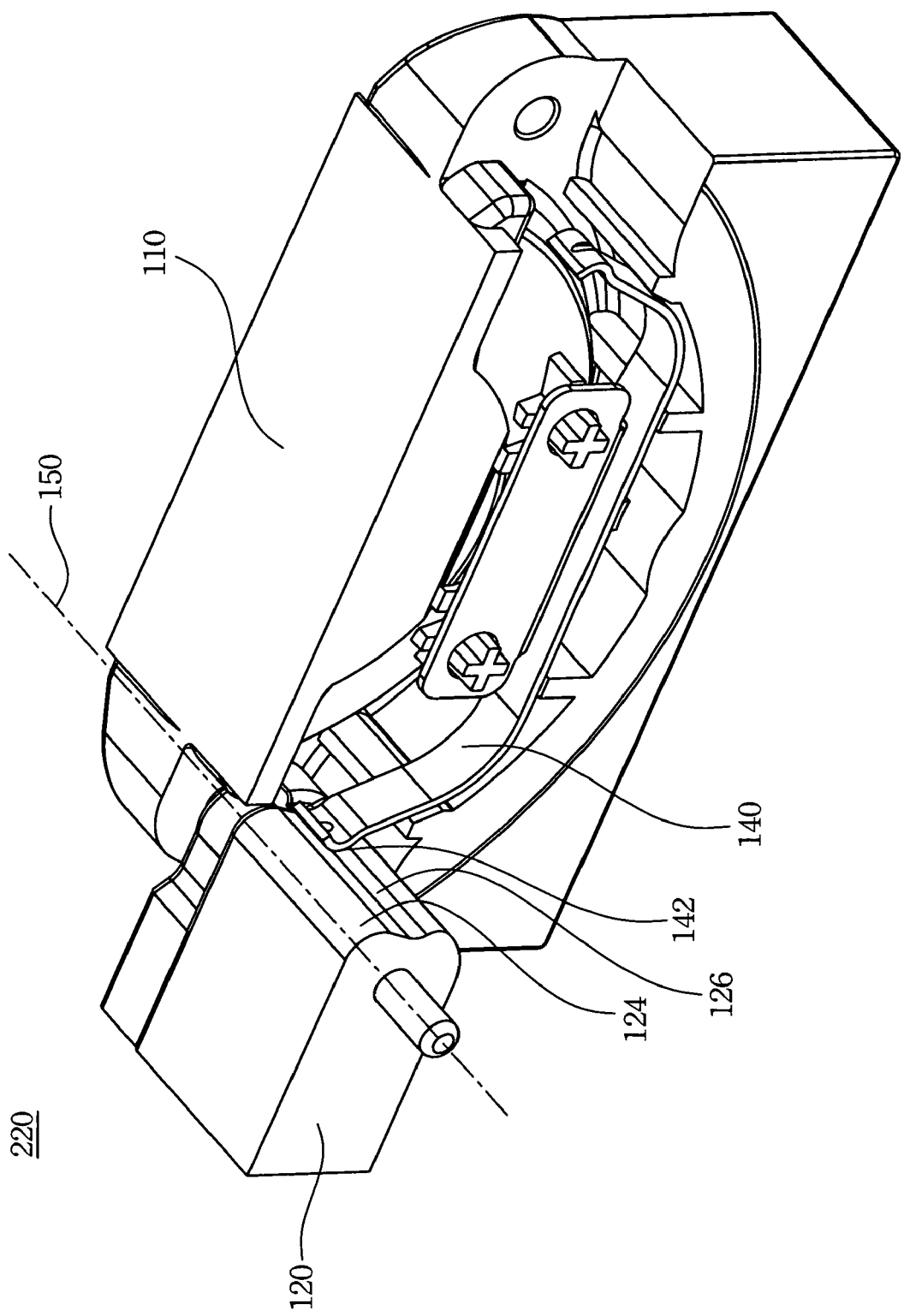

Refer to FIG. 2A, FIG. 2B and to FIG. 2C. FIG. 2A, FIG. 2B and FIG. 2C illustrate different operation states of the embodiment of the invention in FIG. 1. In the operation state 200 of FIG. 2A, the foldable handheld device 100 is at a first position, wherein the second casing 120 is approximately perpendicular to the first casing 110. Namely, the foldable handheld device 100 is opened at the first position. The support surface 122 of the second casing 120 touches the first casing 110, thus the first casing 110 can support the second casing 120, so that the second casing 120 would not be tilted toward the elastic piece 140. The protrusion 142 of the elastic piece 140 touches the support surface 122 of the second casing 120, wherein the elastic piece 140 touches the end close to the first casing 110 of the second casing 120. Namely, the elastic piece 140 touches the bottom of the second casing 120, so that the elastic force provided by the elastic piece 140 is applied to the bottom of the second casing 120, and the second casing 120 would not tilt opposite to the first casing 110 when there is no external force applied on the second casing 120. Thus the second casing 120 can be kept approximately perpendicular to the first casing 110 when the foldable handheld device 100 is at the first position.

Then, refer to FIG. 2B. In the operation state 210 of FIG. 2B, the external force is applied on the second casing 120 by the user to overcome the elastic force provided by the elastic piece 140, and the second casing 120 is pushed and tilted opposite to the first casing 110. The second casing 120 can be rotated related to the first casing 110 along the rotating axle 150 when there is the external force applied thereon. The elastic piece 140 is disposed approximately perpendicular to the rotating axle 150. The curved surface 124 of the second casing 120 is the smooth surface. The end of the elastic piece 140 keeps touching the second casing 120 and smoothly slides on the curved surface 124 when the second casing 120 is pushed and tilted. A swing motion of the elastic piece 140 would be generated when the second casing 120 is pushed, and the swing route of the elastic piece 140 would be controlled by the shape of the curved surface 124 of the second casing 120, which can be regarded as a cam.

Finally, refer to FIG. 2C. In the operation state 220 of FIG. 2C, the second casing 120 has been tilted opposite to the first casing 110 and rotated along the rotating axle 150 to a second position, wherein the curved surface 124 of the second casing 120 is kept touching the protrusion 142 of the elastic piece 140 until the protrusion 142 is coupled to the concave portion 126. Namely, the foldable handheld device 100 is opened at the second position. The protrusion 142 of the elastic piece 140 is coupled to the concave portion 126 of the second casing 120 to limit the movement of the second casing 120, so that the foldable handheld device 100 can be kept at the second position.

As shown in FIG. 2A to FIG. 2C, the second casing 120 can be rotated related to the first casing 110 between the first position and the second position along the rotating axle 150. The angle of the second casing 120 related to the first casing 110 is from 0 degree to 90 degree. The protrusion 142 of the elastic piece 140 is kept touching the second casing 120 when the second casing 120 is rotated related to the first casing 110. The protrusion 142 of the elastic piece 140 is contact with the support surface 122 of the second casing 120 to keep the foldable handheld device 100 at the first position. Then an external force is applied on the second casing 120 to tilt the second casing 120 opposite to the first casing 110, wherein elastic piece 140 is kept touching and slid on the second casing 120 until the protrusion 142 is coupled to the concave portion 126 of the second casing 120 to keep the second casing 120 at the second position. Another external force is further applied on the second casing 120 to release the protrusion 142 from the concave portion 126, and the protrusion 142 is slid on the curved surface 124 when the second casing 120 is rotated related to the first casing 110 and back to the first position.

The curved surface 124 of the second casing 120 can be regarded as a cam. The concave portion 126 and the elastic piece 140 can be regarded as the position mechanism to position the second casing 120. The elastic piece 140 is kept touching the second casing 120 to provide an initial stress between the second casing 120 and the elastic piece 140 when the foldable handheld device 100 is closed or opened. The protrusion 142 of the elastic piece 140 touches the support surface 122 to keep the second casing 120 at the first position. The protrusion 142 of the elastic piece 140 couples to the concave portion 126 to keep the second casing at the second position.

Although the present invention has been described in considerable detail with reference to certain embodiments thereof, other embodiments are possible. Therefore, the spirit and scope of the appended claims should no be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A foldable handheld device comprising:
   a first casing;
   a second casing comprising a curved surface, and a support surface connected to and being approximately perpendicular to the curved surface;
   a connecting mechanism for connecting the first casing and the second casing, so that the second casing is rotatable relative to the first casing; and
   a position mechanism comprising:
      an elastic piece disposed on the first casing, an end of the elastic piece having a protrusion disposed thereon; and
      a concave portion disposed on the curved surface of the second casing;
      wherein when the second casing is rotated relative to the first casing, the protrusion of the elastic piece is slid on the curved surface to couple to the concave portion to thereby position the second casing at a first operation state, and is further slid to be released from the concave portion, to thereby position the second casing at a second operation state when the protrusion touches the support surface.

2. The foldable handheld device of claim 1, wherein the connecting mechanism comprises a shaft passing through the second casing and fixed on the first casing, such that the second casing is rotatable related to the first casing.

3. The foldable handheld device of claim 1, wherein the first casing comprises a position pin, and the elastic piece comprises a position hole coupling to the position pin.

4. The foldable handheld device of claim 1, wherein the elastic piece is disposed approximately perpendicular to an axis of rotation.

5. The foldable handheld device of claim 1, wherein the curved surface comprises two convex portions, and the concave portion is located between the convex portions.

6. The foldable handheld device of claim 1, wherein a material of the elastic piece is an elastic material.

* * * * *